US008963920B2

United States Patent
Park et al.

(10) Patent No.: US 8,963,920 B2
(45) Date of Patent: Feb. 24, 2015

(54) IMAGE PROCESSING APPARATUS AND METHOD

(75) Inventors: Chan Min Park, Seoul (KR); Tack Don Han, Seoul (KR); Jeong Soo Park, Gwacheon-si (KR); Jae Ho Nah, Seoul (KR); Yun Hye Jung, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 247 days.

(21) Appl. No.: 13/067,515

(22) Filed: Jun. 6, 2011

(65) Prior Publication Data

US 2012/0075287 A1 Mar. 29, 2012

(30) Foreign Application Priority Data

Sep. 28, 2010 (KR) ........................ 10-2010-0093642

(51) Int. Cl.
*G06T 15/06* (2011.01)
(52) U.S. Cl.
CPC ..................................... *G06T 15/06* (2013.01)
USPC .......................................... 345/426; 345/419
(58) Field of Classification Search
CPC ......... G06T 15/06; G06T 15/00; G06T 15/10; G06T 15/60; G06T 17/00
USPC ................................................ 345/419, 426
See application file for complete search history.

(56) References Cited

U.S. PATENT DOCUMENTS

| 5,933,146 | A | * | 8/1999 | Wrigley ......................... 345/420 |
| 7,187,390 | B2 | * | 3/2007 | Usami et al. ................... 345/620 |
| 7,289,118 | B2 | * | 10/2007 | Schmittler et al. ............. 345/423 |
| 2009/0167763 | A1 | * | 7/2009 | Waechter et al. .............. 345/426 |
| 2009/0256845 | A1 | * | 10/2009 | Sevastianov et al. .......... 345/426 |
| 2009/0262132 | A1 | * | 10/2009 | Peterson et al. ............... 345/619 |
| 2010/0053162 | A1 | * | 3/2010 | Dammertz et al. ............ 345/426 |
| 2010/0073370 | A1 | * | 3/2010 | McCombe et al. ............ 345/426 |
| 2011/0050698 | A1 | * | 3/2011 | Peterson et al. ............... 345/426 |
| 2011/0069067 | A1 | * | 3/2011 | Ozdas et al. ................... 345/426 |
| 2012/0249553 | A1 | * | 10/2012 | Peterson et al. ............... 345/426 |

FOREIGN PATENT DOCUMENTS

KR 10-2008-0052328 6/2008
KR 10-2009-0065353 6/2009

OTHER PUBLICATIONS

Kensler, A.; Optimizing Ray-Triangle Intersection via Automated Search; 2006; Interactive Ray Tracing 2006, IEEE Symposium on; pp. 33-38.*

* cited by examiner

*Primary Examiner* — Kimbinh T Nguyen
(74) *Attorney, Agent, or Firm* — NSIP Law

(57) ABSTRACT

Provided is an image processing apparatus. The image processing apparatus may perform an intersection test for rendering of a ray tracing scheme. The image processing apparatus may include a first calculator and a second calculator. The first calculator may perform a ray-plane test to determine whether a ray intersects a plane including a primitive and a barycentric test to determine whether the ray intersects the primitive. The second calculator may calculate a hit point based on the ray which intersects the primitive.

14 Claims, 7 Drawing Sheets

500

IMAGE PROCESSING APPARATUS AND METHOD

CROSS-REFERENCE TO RELATED APPLICATIONS

This application claims the priority benefit of Korean Patent Application No. 10-2010-0093642, filed on Sep. 28, 2010, in the Korean Intellectual Property Office, the disclosure of which is incorporated herein by reference.

BACKGROUND

1. Field

Embodiments relate to an image processing apparatus and method that may perform an intersection test between a ray and a primitive in image rendering of a ray tracing scheme.

2. Description of the Related Art

Three-dimensional (3D) rendering corresponds to image processing for synthesizing 3D object data to an image observed at a given camera viewpoint.

A rendering scheme may include a rasterization scheme of generating an image while projecting a 3D object onto a screen, a ray tracing scheme of generating an image by tracing a path of incident light along a ray towards each pixel of an image observed at a camera viewpoint, and the like.

Here, the ray tracing scheme may generate a high quality image by using physical properties of light, for example, a reflection, a refraction, a transmission, and the like, for a rendering result. However, due to a relatively great amount of calculations, the ray tracing scheme may have a difficulty in high speed rendering.

Factors of a ray tracing performance using a great amount of calculations may include generation and traversal of an acceleration structure (AS) where scene objects to be rendered are spatially divided, and an intersection test between a ray and a primitive.

SUMMARY

According to an aspect, there is provided an image processing apparatus for performing an intersection test for rendering of a ray tracing scheme for a three dimensional (3D) image, including: a first calculator to perform a ray-plane test to determine whether a ray intersects a plane including a primitive and a barycentric test to determine whether the ray intersects the primitive; and a second calculator to calculate a hit point, based on the ray which intersects the primitive, using at least one processor.

When the ray intersects the plane including the primitive as a result of the ray-plane test, the first calculator may perform the barycentric test to determine whether the ray intersects the primitive.

When the ray intersects the primitive as a result of the barycentric test, the second calculator may calculate the hit point regarding that the ray intersects the primitive.

The image processing apparatus may further include a determination unit to determine at least one of whether the ray intersects the plane including the primitive as a result of the ray-plane test, and whether the ray intersects the primitive as a result of the barycentric test.

The first calculator may include a plurality of unit calculation modules to perform the ray-plane test and the barycentric test.

Each of the unit calculation modules may process in parallel at least one of the ray-plane test and the barycentric test with respect to different rays.

When the ray intersects the plane including the primitive as a result of the ray-plane test, the image processing apparatus may read primitive data to be used for the barycentric test, and may perform the barycentric test for determining whether the ray intersects the primitive.

According to an aspect, there is provided an image processing method for performing an intersection test for rendering of a ray tracing scheme, including: performing a ray-plane test for determining whether a ray intersects a plane including a primitive; performing a barycentric test for determining whether the ray intersects the primitive; and calculating a hit point regarding that the ray intersects the primitive.

The performing of the barycentric test may include determining whether the ray intersects the primitive when the ray is determined to intersect the plane including the primitive as a result of the ray-plane test.

The calculating may include calculating the hit point regarding that the ray intersects the primitive when the ray is determined to intersect the primitive as a result of the barycentric test.

The performing of the ray-plane test and the performing of the barycentric test may be performed by a first calculator of an image processing apparatus, and the calculating may be performed by a second calculator of the image processing apparatus.

At least one of the performing of the ray-plane test and the performing of the barycentric test may be performed in parallel with respect to different rays.

The image processing method may further include reading primitive data to be used for the barycentric test prior to performing of the barycentric test when the ray intersects the plane including the primitive as a result of the ray-plane test.

According to another aspect of one or more embodiments, there is provided at least one non-transitory computer readable medium storing computer readable instructions to implement methods of one or more embodiments.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
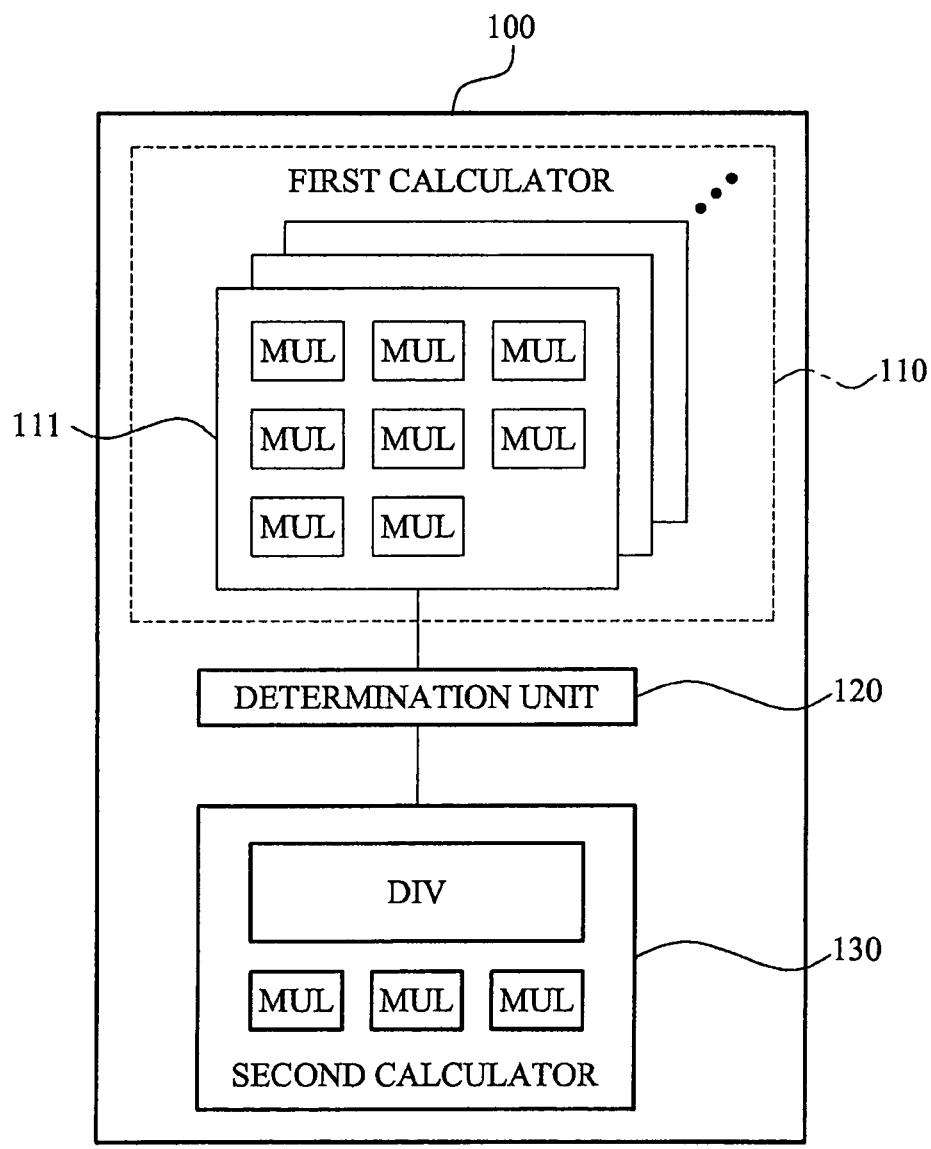
FIG. 1 illustrates an image processing apparatus according to one or more embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an image processing apparatus 100 according to example embodiments.

During a ray tracing process, the image processing apparatus 100 may determine a primitive that intersects a ray, and a hit point that is an intersecting point, based on primitive data of an acceleration structure.

Referring to FIG. 1, the image processing apparatus 100 may include a first calculator 110, a determination unit 120, and a second calculator 130.

The first calculator 110 may perform a ray-plane test for determining whether a ray generated for ray tracing intersects a plane including a primitive, and a barycentric test for determining whether the ray intersects the primitive.

The first calculator 110 may perform the ray-plane test by reading only data required for the ray-plane test.

When the ray is determined to intersect the plane including the primitive as a result of the ray-plane test, the first calculator 110 may perform the barycentric test by additionally reading data for the barycentric test.

Accordingly, with respect to a ray-and-primitive combination for which total data of a primitive is not fetched in advance or not read, and for which the barycentric test is not used, the image processing apparatus 100 may omit data fetch or read for the barycentric test.

Consequently, it is possible to decrease a size of a cache memory to cache primitive data for the same level of cache hit, and to decrease a memory bandwidth for primitive data fetch.

The determination unit 120 may determine whether the ray intersects the plane including the primitive as the ray-plane test result.

The determination unit 120 may also determine whether the ray intersects the primitive as a result of the barycentric test.

When the determination unit 120 determines the ray intersects the primitive as a result of the barycentric test, the second calculator 130 may calculate a hit point regarding that the ray intersects the primitive (based on the ray intersecting the primitive).

The first calculator 130 may include a plurality of unit calculation modules 111 that may sequentially and/or simultaneously perform the ray-plane test and the barycentric test between a single ray and a single primitive.

The plurality of unit calculation modules 111 may have a parallel topology.

The plurality of unit calculation modules 111 may perform the ray-plane test and/or the barycentric test in parallel with each of different rays and a single primitive.

The plurality of unit calculation modules 111 may perform the ray-plane test and/or the barycentric test in parallel with each of different primitives with respect to a single ray.

The plurality of unit calculation modules 111 may perform the ray-plane test and/or the barycentric test in parallel with respect to each of different rays and different primitives.

Multiplexers MUL within the single unit calculation module 111 may be used for both the ray-plane test and the barycentric test.

A portion of the multiplexers MUL within the unit calculation module 111 may be used for both the ray-plane test and the barycentric test, whereas a portion of remaining multiplexers MUL may be used for one of the ray-plane test and the barycentric test.

By employing a portion of the multiplexers MUL for both the ray-plane test and the barycentric test, it is possible to decrease a number of multiplexers and to significantly decrease a total circuit size.

A divider DIV and multiplexers MUL within the second calculator 130 may be used for the hit point calculation.

A size of the divider is relatively large compared to a multiplexer and thus, may use a relatively large portion of circuit manufacturing costs. According to example embodiments, a number of dividers for an intersection test may significantly decrease and thus, circuit manufacturing costs may also significantly decrease and idle resources may be reduced.

Here, reducing of idle resources may be understood as follows:

In general, an intersection test between a ray generated during a ray tracing process and a primitive, for example, a triangle may be conceptually divided into the following three operations.

One operation corresponds to a ray-plane test operation for determining whether the ray intersects a plane including the primitive, another operation corresponds to a barycentric test operation for determining whether the ray intersects the primitive, and still another operation corresponds to an operation for calculating a hit point based on the ray intersecting the primitive.

The above three operations may be sequentially or simultaneously performed. When a test of a previous operation is not passed, a subsequent test may not be performed.

In a conventional art, each unit module to perform an intersection test between a ray and a primitive may include all the calculation units, for example, multipliers and a divider that may perform each of the ray-plane test, the barycentric test, and the hit point calculation.

Statistically, in many cases, there is no need to perform the barycentric test or the hit point calculation since the ray-plane test is not passed during the intersection test with a single primitive with respect to a single ray. In addition, in many cases, the ray-plane test is passed, however, the barycentric test is not passed and thus, there is no need to perform the hit point calculation.

According to a configuration of the conventional intersection test module, since a relatively large number of calculation units are provided for the barycentric test or the hit point calculation, a rate of idle resources may be high.

According to example embodiments, the ray-plane test and the barycentric test using only multiplexers may be performed by the first calculator 110, and the hit point calculation using multiplexers and a diver may be performed by the second calculator 130.

When the first calculator 110 performs the ray-plane test between the ray and the primitive, the determination unit 120 may determine whether a ray and primitive pair pass the ray-plane test. When the ray and primitive pair pass the ray-plane test, the first calculator 110 may perform the barycentric test with respect to the ray and primitive pair.

The determination unit 120 may also determine whether the ray and primitive pair pass the barycentric test. When the ray and primitive pair pass the barycentric test, the second calculator 130 may perform the hit point calculation based on the ray intersecting the primitive.

According to example embodiments, it is possible to minimize idle resources, to decree a circuit size, and to significantly decrease a memory bandwidth.

Figure 2:
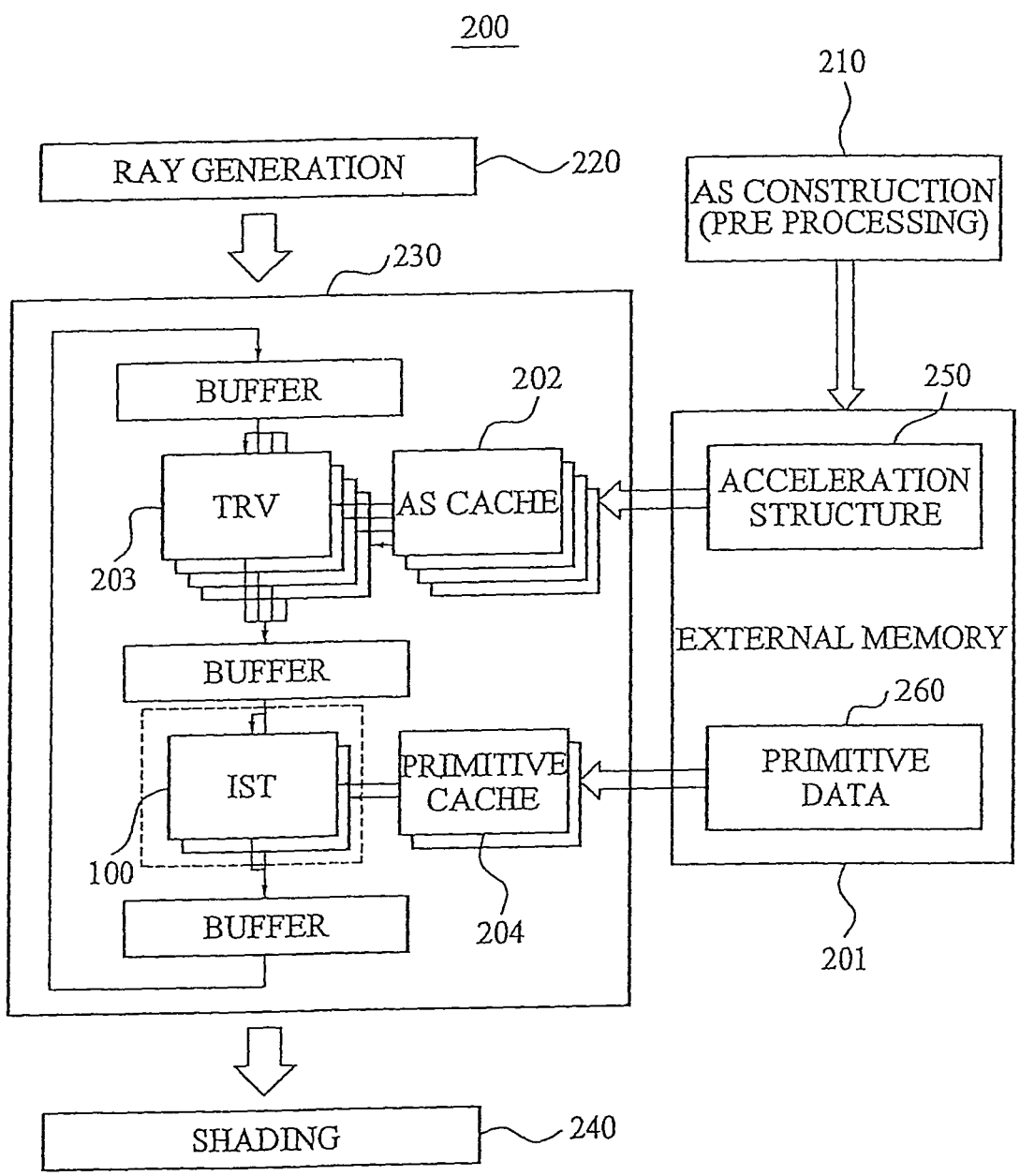
FIG. 2 illustrates a total ray tracing process including the image processing apparatus of FIG. 1 according to one or more embodiments.

FIG. 2 illustrates a total ray tracing process 200 including the image processing apparatus 100 of FIG. 1 according to example embodiments.

When a construction of an acceleration structure is performed as a pre-processing process of ray tracing in operation 210, the generated acceleration structure 250 and each primitive data 260 may be stored in an external memory 201, for example, a dynamic random access memory (DRAM).

When a ray is generated in operation 220, a traversal (TRV) 203 may be performed with respect to the ray regarding (based on) which leaf node within the acceleration structure is associated with respect to the ray in operation 230.

In operation 230, a portion of the acceleration structure may be fetched from an acceleration structure (AS) cache 202 and thereby be used.

The image processing apparatus 100 may perform an intersection test (IST) with respect to a plurality of primitives, for example, triangles within a predetermined leaf node.

In this example, primitive data corresponding to an intersection test target may be fetched from a primitive cache 204 and thereby be used.

Even though the intersection test is performed between the ray and a predetermined primitive, all the data of the predetermined data may not be fetched at a one time and be fetched using a plurality of operations.

For example, in an operation where the first calculator 110 of the image processing apparatus 100 performs a ray-plane test, only data of a portion required for the ray-plane test may be fetched in advance. In an operation where the first calculator 110 performs a barycentric test due to passing of the ray-plane test, data of a portion for the barycentric test may also be fetched.

Accordingly, when a proceeding is not performed up to the barycentric test, a fetch amount of primitive data may decrease.

When a primitive corresponding to a current test target does not pass one of the ray-plane test and the barycentric test, the image processing apparatus 100 may recursively perform the intersection test with respect to another primitive included in the same leaf node as the primitive within the acceleration structure.

When all the primitives within the leaf node do not pass one of the ray-plane test and the barycentric test, a traversal of another leaf node may be performed. The image processing apparatus 100 may perform the intersection test with respect to primitives within the newly traversed leaf node using the same process.

When a primitive passing both the ray-plane test and the barycentric test is found, the second calculator 130 of the image processing apparatus 100 may perform the hit point calculation. In operation 240, shading of a color value may be performed with respect to a hit point.

Figure 3:
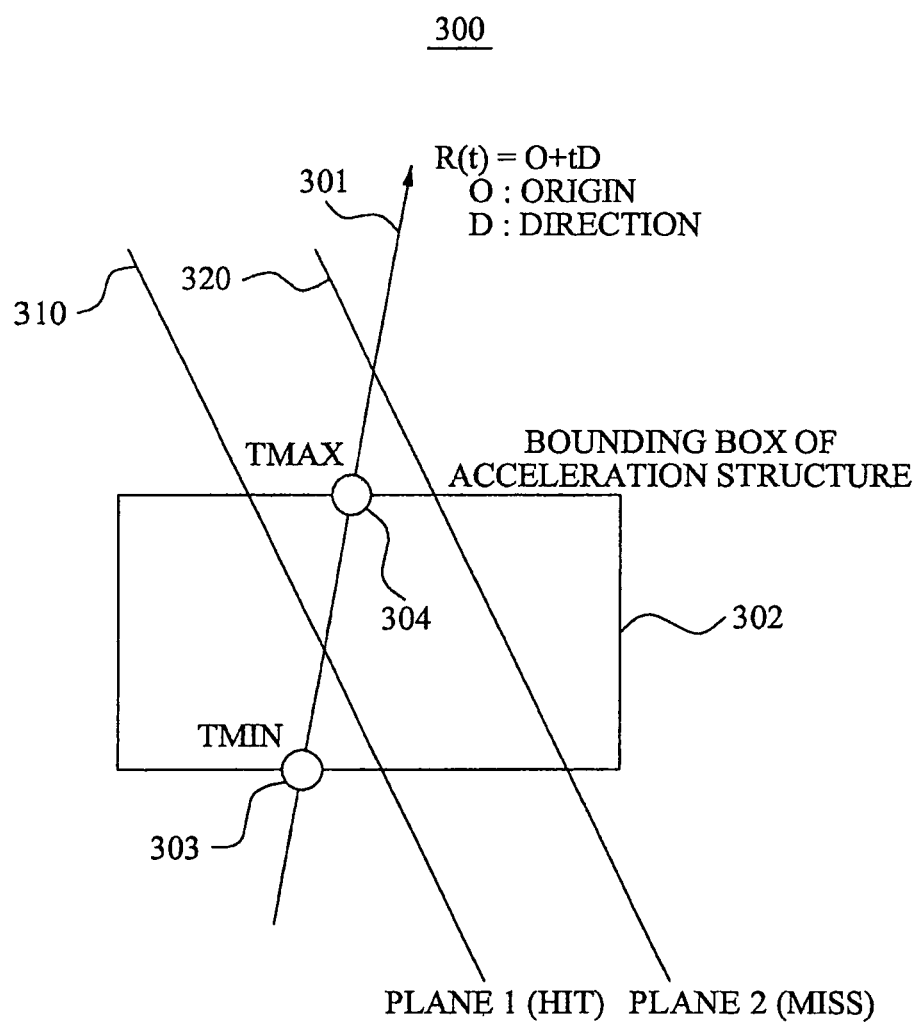
FIG. 3 illustrates a diagram to describe a ray-plane test performed by a first calculator of the image processing apparatus of FIG. 1 according to one or more embodiments.

FIG. 3 illustrates a diagram 300 to describe a ray-plane test performed by the first calculator 110 of the image processing apparatus 100 according to example embodiments.

An intersection test between a single ray and a primitive may be performed according to Equation 1.

$$O + t \cdot D = A + u \cdot (B-A) + v \cdot (C-A),\qquad \text{[Equation 1]}$$

where O denotes an origin of the ray, D denotes a direction vector, and A, B, and C denote three vertices of a triangle.

A process of obtaining a solution of Equation 1 may obtain t that is a ray parameter, and u and v that are barycentric coordinates.

Using a matrix, Equation 1 may be arranged to Equation 2.

$$[-D, B-A, C-A]\begin{bmatrix} t \\ u \\ v \end{bmatrix} = O - A \qquad \text{[Equation 2]}$$

Equation 2 may be arranged to Equation 3, and t, u, and v that are solutions of Equation 1 may be obtained.

$$\begin{bmatrix} t \\ u \\ v \end{bmatrix} = \frac{1}{(D \times (B-A)) \cdot (C-A)} \begin{bmatrix} (O-A) \times (C-A) \cdot (B-A) \\ (D \times (B-A)) \cdot (O-A) \\ ((O-A) \times (C-A)) \cdot D \end{bmatrix} \qquad \text{[Equation 3]}$$

With respect to t, the ray-plane test may be performed according to Equation 4.

$$t_{min} \le t \le t_{max} \qquad \text{[Equation 4]}$$

The determination unit 120 of the image processing apparatus 100 may determine whether Equation 4 is satisfied with respect to a plane (1) 310 within a bounding box 302 of an acceleration structure.

When Equation 4 is satisfied, the plane (1) 310 may intersect a ray 301 and thus, a primitive included in the plane (1) 310 may pass the ray-plane test.

TMIN 303 (tmin) denotes a minimum value of a ray parameter corresponding to the bounding box 302 of the acceleration structure, and TMAX 304 (tmax) denotes a maximum value of the ray parameter.

When a predetermined primitive does not pass the ray-plane test, a plane (2) 320 including the predetermined primitive may not satisfy Equation 4. In this case, the intersection test for the primitive is terminated.

The determination unit 120 may perform the ray-plane test according to the aforementioned scheme. Only with respect to the primitive passing the ray-plane test, the first calculator 110 may perform the barycentric test. A process of the barycentric test will be further described with reference to FIG. 4.

Figure 4:
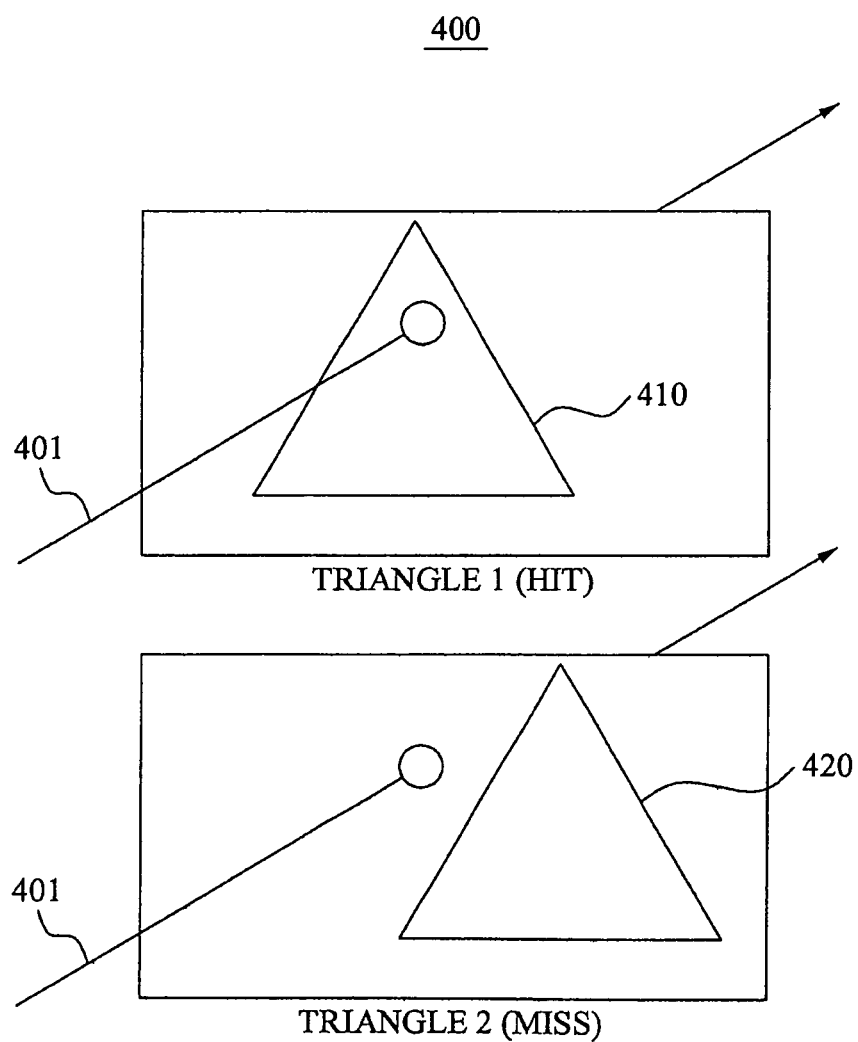
FIG. 4 illustrates a diagram to describe a barycentric test performed by the first calculator of the image processing apparatus of FIG. 1 according to one or more embodiments.

FIG. 4 illustrates a diagram 400 to describe a barycentric test performed by the first calculator 110 of the image processing apparatus 100 according to example embodiments.

The barycentric test may be performed to determine whether an intersecting point between a ray and a plane is included within a primitive, for example, a triangle, that is, to determine whether the ray intersects the primitive using barycentric coordinates (u, v) that are determined according to Equation 3.

The barycentric test may be performed using following Equation 5, Equation 6, and Equation 7.

$$u \ge 0 \qquad \text{[Equation 5]}$$

$$v \ge 0 \qquad \text{[Equation 6]}$$

$$(u+v) \le 1 \qquad \text{[Equation 7]}$$

When all of Equation 5, Equation 6, and Equation 7 are satisfied, the ray may be determined to intersect the primitive and thus, pass the barycentric test. The determination may be made by the determination unit 120.

Referring to FIG. 4, a triangle (1) 410 may satisfy all of Equation 5, Equation 6, and Equation 7 with respect to a ray 401 and thus, pass the barycentric test. A triangle (2) 420 may not satisfy at least one of Equation 5, Equation 6, and Equation 7 and thus, may not pass the barycentric test.

When the barycentric test is passed, the second calculator 130 of the image processing apparatus 100 may perform a hit point calculation regarding at which point within the primitive the ray intersects.

Figure 5:
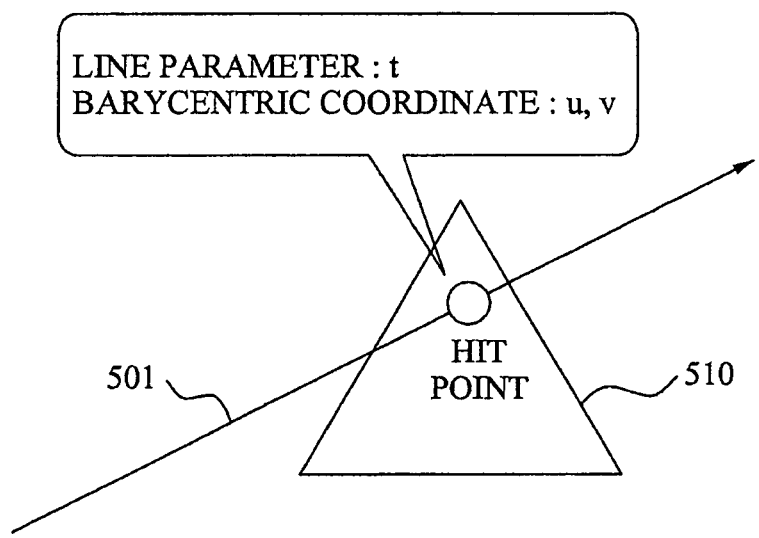
FIG. 5 illustrates a diagram to describe a hit point calculation performed by a second calculator of the image processing apparatus of FIG. 1 according to one or more embodiments.

FIG. 5 illustrates a diagram 500 to describe a hit point calculation performed by the second calculator 130 of the image processing apparatus 100 according to example embodiments.

The second calculator 130 may determine a line parameter t and barycentric coordinates u and v by calculating an accurate hit point between a ray 501 and a triangle 510.

Figure 6:
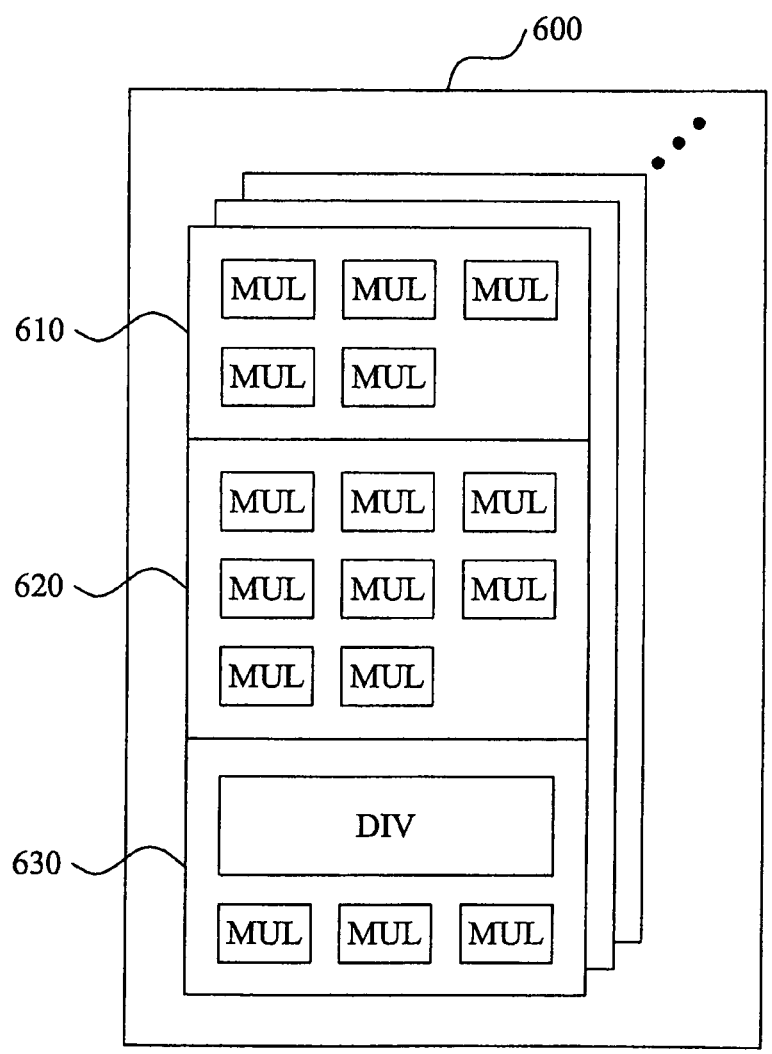
FIG. 6 illustrates a diagram to compare the image processing apparatus of FIG. 1 according to one or more embodiments and a conventional intersection test module.

FIG. 6 illustrates a diagram to compare the image processing apparatus of FIG. 1 according to example embodiments and a conventional intersection test module 600.

In the case of the conventional intersection module 600, each unit module may include a portion 610 for a ray-plane test, a portion 620 for a barycentric test, and a portion 630 for a hit point calculation. Here, a plurality of unit modules may be included in the conventional intersection module 600.

Accordingly, when the ray-plane test or the barycentric test is not passed during an intersection test of a ray, the portion 620 and/or the portion 630 may become in an idle state and thus, resources may be wasted.

However, as shown in FIG. 1, in the image processing apparatus 100 according to example embodiments, the first calculator 110 may sequentially perform the ray-plane test and the barycentric test by integrating the portion 610 and the portion 620, and the second calculator 130 may perform a hit point calculation.

Cases where a process up to the hit point calculation is performed may be small and thus, a relatively small number of second calculators 130 compared to a number of unit calculation modules 111 within the first calculator 110 may be included in the image processing apparatus 100.

Figure 7:
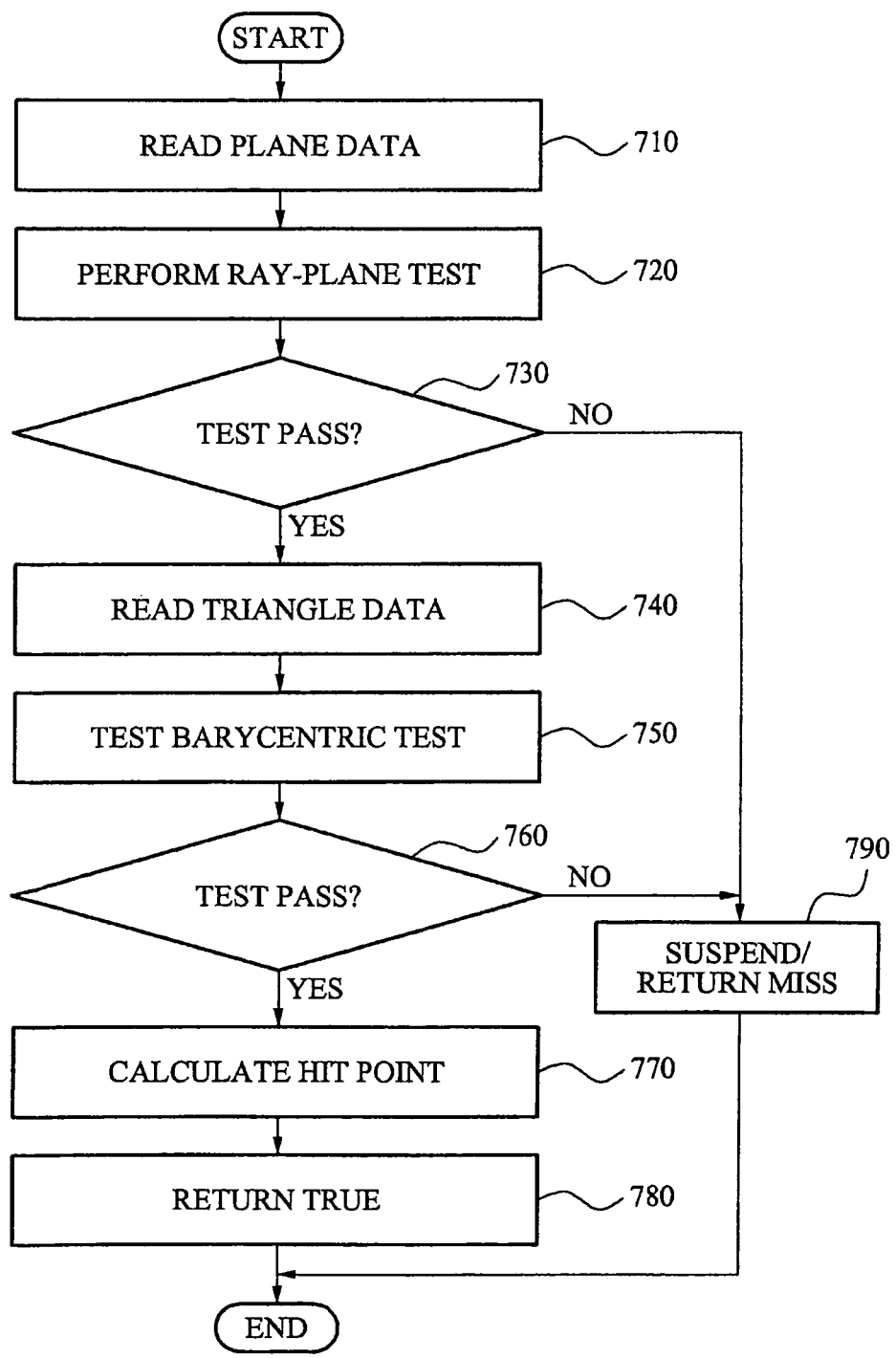
FIG. 7 illustrates an image processing method according to one or more embodiments.

FIG. 7 illustrates an image processing method according to example embodiments.

In operation 710, the first calculator 110 of the image processing apparatus 100 may read, from data of a primitive that is a triangle, plane data corresponding to plane information including the triangle.

In operation 720, the first calculator 110 may perform a ray-plane test with respect to a plane. The ray-plane test is described above with reference to FIG. 1 and FIG. 3 and thus, further descriptions will be omitted here.

In operation 730, the determination unit 120 may determine whether the primitive passes the ray-plane test.

When the primitive passes the ray-plane test, the first calculator 110 may read, from data of the primitive, triangle data corresponding to triangle information in operation 740, and the first calculator 110 may perform a barycentric test in operation 750. The barycentric test is described above with reference to FIG. 3 and FIG. 4 and thus, further descriptions will be omitted here.

In operation 760, the determination unit 120 may determine whether the primitive passes the barycentric test.

When the primitive passes the barycentric test, the second calculator 130 may calculate a hit point in operation 770. This case corresponds to 'return true' operation 780. The image processing method for the intersection test may be terminated.

Conversely, when the determination unit 120 determines the ray does not pass the test in operation 730 or operation 760, the intersection test may be suspended with respect to the corresponding primitive. This case corresponds to 'return miss' in operation 790 and the intersection test may be terminated.

Accordingly, the intersection test may be performed with respect to another primitive.

The image processing method according to the above-described embodiments may be recorded in non-transitory computer-readable media including computer readable instructions such as a computer program to implement various operations by executing computer readable instructions to control one or more processors, which are part of a general purpose computer, a computing device, a computer system, or a network of devices. The media may also have recorded thereon, alone or in combination with the computer readable instructions, data files, data structures, and the like. The computer readable instructions recorded on the media may be those specially designed and constructed for the purposes of the embodiments, or they may be of the kind well-known and available to those having skill in the computer software arts. The computer-readable media may also be embodied in at least one application specific integrated circuit (ASIC) or Field Programmable Gate Array (FPGA), which executes (processes like a processor) computer readable instructions. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of computer readable instructions include both machine code, such as produced by a compiler, and files containing higher level code that may be executed by the computer using an interpreter. The described hardware devices may be configured to act as one or more software modules in order to perform the operations of the above-described embodiments, or vice versa. Another example of media may also be a distributed network, so that the computer readable instructions are stored and executed in a distributed fashion.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing apparatus for performing an intersection test for rendering of a ray tracing scheme for a three dimensional (3D) image, comprising:
   a first calculator to perform a ray-plane test to determine whether a ray intersects a plane including a primitive and to perform a barycentric test to determine whether the ray intersects the primitive using at least one processor, wherein the first calculator comprises a plurality of unit calculation modules to perform the ray-plane test and to perform the barycentric test; and
   a second calculator to calculate a hit point, based on the ray which intersects the primitive, using at least one processor,
   wherein the number of unit calculation modules of the first calculator is greater than the number of processors of the second calculator,
   wherein the second calculator performs the hit point calculation, when the ray-plane test and the barycentric test are passed.

2. The image processing apparatus of claim 1, wherein when the ray intersects the plane including the primitive as a result of the ray-plane test, the first calculator performs the barycentric test to determine whether the ray intersects the primitive.

3. The image processing apparatus of claim 1, wherein when the ray intersects the primitive as a result of the barycentric test, the second calculator calculates the hit point based on the ray intersecting the primitive.

4. The image processing apparatus of claim 1, further comprising:
a determination unit to determine at least one of whether the ray intersects the plane including the primitive as a result of the ray-plane test, and whether the ray intersects the primitive as a result of the barycentric test.

5. The image processing apparatus of claim 1, wherein each of the unit calculation modules processes in parallel at least one of the ray-plane test and the barycentric test with respect to different rays.

6. The image processing apparatus of claim 1, wherein when the ray intersects the plane including the primitive as a result of the ray-plane test, the image processing apparatus reads primitive data to be used for the barycentric test, and performs the barycentric test to determine whether the ray intersects the primitive.

7. An image processing method for performing an intersection test for rendering of a ray tracing scheme for generating a three dimensional (3D) image, comprising:
performing a ray-plane test to determine whether a ray intersects a plane including a primitive;
performing a barycentric test to determine whether the ray intersects the primitive; and
calculating a hit point, based on the ray which intersects the primitive, using at least one processor;
wherein the performing of the ray-plane test and the performing of the barycentric test is performed by a first calculator of an image processing apparatus, wherein the first calculator comprises a plurality of of unit calculation modules to perform the ray-plane test and to perform the barycentric test,
the calculating is performed by a second calculator of the image processing apparatus, and
the number of unit calculation modules of the first calculator is greater than the number of processors used to calculate a hit point,
wherein the second calculator performs the hit point calculation, when the ray-plane test and the barycentric test are passed.

8. The image processing method of claim 7, wherein the performing of the barycentric test comprises determining whether the ray intersects the primitive when the ray is determined to intersect the plane including the primitive as a result of the ray-plane test.

9. The image processing method of claim 7, wherein the calculating comprises calculating the hit point regarding that the ray intersects the primitive when the ray is determined to intersect the primitive as a result of the barycentric test.

10. The image processing method of claim 7, wherein at least one of the performing of the ray-plane test and the performing of the barycentric test is performed in parallel with respect to different rays.

11. The image processing method of claim 7, further comprising:
reading primitive data to be used for the barycentric test prior to performing of the barycentric test when the ray intersects the plane including the primitive as a result of the ray-plane test.

12. At least one non-transitory computer-readable medium storing computer readable instructions to control at least one processor to implement the method of claim 7.

13. The image processing apparatus of claim 1, wherein each unit calculation module include one or more multiplexer and does not include a divider, and
wherein the second calculator includes at least one multiplexer and at least one divider.

14. The image processing method of claim 7, wherein each unit calculation module include one or more multiplexer and does not include a divider, and
wherein the second calculator includes at least one multiplexer and at least one divider.

* * * * *